United States Patent Office 3,267,051
Patented August 16, 1966

3,267,051
METHODS FOR MANUFACTURING RIGID CELLULAR PRODUCTS BASED ON POLYVINYLCHLORIDE, AND PRODUCTS RESULTING THEREFROM
Yvan Landler, Sceaux, and Pierre Henri Lebel, Rueil Malmaison, France, assignors to Societe anonyme dite: Pneumatiques, Caoutchouc Manufacture et Plastiques Kleber Colombes, Colombes, France
No Drawing. Filed Jan. 22, 1963, Ser. No. 253,060
Claims priority, application France, Jan. 22, 1962, 885,558
7 Claims. (Cl. 260—2.5)

The present invention relates to methods for manufacturing rigid cellular products with closed cells, based on polyvinylchloride, and has for an object, improvements therein.

Cellular products have been developed owing to their heat- and sound-insulating properties. These insulating properties depend on the nature of the gas which fills the cells. Thus, in the case of cellular polyurethanes, excellent results have been obtained from the use of saturated halogenated hydrocarbons. Indeed, the halogenated alkanes have no chemical or physical action on the polyesters and polyethers or polyurethanes and thus cannot escape from the cells provided the cellular body is made up of closed cells.

In the case of cellular polyvinylchlorides, the saturated halogenated hydrocarbons have a softening action and sometimes are even solvents. Hence their use is far more limited. Nevertheless, there have been proposals to use some of them, such as tetrachlorethanes mixed with polyvinylchloride and a swelling agent, and to pass moulds containing these mixtures under a hot press to manufacture the rigid cellular products. Under these conditions, even if the product is made up of closed cells, the halogenated hydrocarbon diffuses through the walls of the cells and totally disappears if the cellular product after removal from the mould is heated for 1 or 2 days to temperatures of the order of 100° C.

It is an object of the present invention to provide rigid cellular products exhibiting closed cells and based on polyvinylchloride, which is cross-linked and the cells of which contain a saturated halogenated hydrocarbon, and also a process for their manufacture.

We have found that by introducing a hydrocarbon of this type into mixtures described in U.S.A. patent application S.N. 154,075, now U.S. Pat. No. 3,200,089, cellular products can be obtained having closed cells containing halogenated saturated hydrocarbons, and that these hydrocarbons do not escape from the cells, even after heating to temperatures higher than their boiling point.

In other words, we have found that saturated halogenated hydrocarbons are not a solvent of the cellular products obtained in the above patent application.

The improved process which is the object of the present invention therefore consists in the introduction of a saturated halogenated hydrocarbon into a moulding mixture containing polyvinylchloride, a polyisocyanate, a swelling agent, at least one vinylidenic monomer, and an ethylenic anhydride which is capable of copolymerising with the said monomer, heating a mould containing this mixture to about 160 to 200° C., and then cooling it under pressure, and finally heating the product, after removal from the mould, in the presence of water or water vapour. Under these conditions, there is a graft of copolymer chains of vinylidenic monomer and ethylenic anhydride on the polyvinylchloride, and cross-linking as a result of the action of the polyisocyanate.

The present invention stems from the discovery that the halogenated alkanes which dissolve the polyvinylchloride do not dissolve the grafted and cross-linked polyvinylchloride which makes up the walls of the cells of the cellular products obtained by the above process.

As has been shown, this invention applies to mixtures having a polyvinylchloride base. It will be appreciated that the copolymers of vinylchloride or mixtures of copolymers or polymers of vinyl chloride with other polymers also come within the scope of the present invention.

The quantity of the polyvinylchloride utilised depends upon the final density it is desired to obtain; it is generally between 20 and 95% and preferably between 30 and 70% by weight of the initial mixture.

The isocyanate utilised is preferably a polyisocyanate such as the p-p'-p"-triisocyanate of triphenylmethane called Desmodur R by Farbenfabriken Bayer (Germany), or alternatively a diisocyanate such as the p-p'-diisocyanate of diphenylmethane, the 2,4-diisocyanate of toluene, the 2,6-diisocyanate of toluene or the like: these isocyanates may also be used in the form of a mixture of one or more of these products. The total quantity of polyisocyanate utilised depends on its nature and of the final result it is desired to achieve; it is generally between 0.5 and 60%, and preferably between 5 and 50% by weight of the initial mixture.

The anhydride utilised in accordance with the invention must be an anhydride copolymerisable with a vinylidenic monomer, such as acrylic anhydride, citraconic anhydride, itaconic anhydride and maleic anhydride; or where the quantity of this anhydride incorporated in the mixture depends on the final density it is desired to achieve after the expansion of the object; it is generally between 2 and 30% by weight of the initial mixture.

The vinylidenic monomers utilised within the scope of the present invention are all those which are polymerised or copolymerised by a radical-type reaction and which contain at least one $CH_2=C<$ group. (It will be appreciated that a mixture of these monomers may equally well be utilised.) Among the vinylidenic monomers, we are referring here to compounds with open chains having conjugated diene connections such as the butadienic hydrocarbons, comprising butadiene-1,3, isoprene, dimethylbutadiene-1,3, or the like, chloroprene, 3-cyano-butadiene-1,3, piperylene or the like, trienes such as myrcene, vinylic or vinylidenic compounds proper such as vinyl chloride, vinylidene chloride, styrolene, p-chlorostyrolene, 3,5-dichlorostyrolene, p-methoxystyrolene, esters, nitriles and the amides of acrylic and alpha-alkylacrylic acids such as methylacrylate, octyl acrylate, methylmethacrylate, lauryl methacrylate, acrylonitrile, alpha - chloroacrylonitrile, methacrylonitrile, dimethylacrylamide, or the like, vinylpyridine, vinyl benzoate, vinylic ketones and ethers, vinylcarbazole, or the like, ethylene, propylene or the like, isobutylene, divinylbenzene or the like compounds containing both olefinic and acetylenic chains such as vinylacetylene, vinylethynyl-carbinal or the like.

Besides the monomers characterised by the $CH_2=C<$ group, the process is also applicable to monomers containing the $CF_2=C<$ group, such as tetrafluoroethylene or the like.

The quantity of vinylidenic monomer utilised is between 2 and 30% by weight of the initial mixture; in many cases, it is as well to add about as many molecules of it, or of its monomers, as of ethylenic anhydride.

According to the present invention, it is advantageous also to incorporate in the mixture a catalyst to ensure the polymerisation or copolymerisation of the vinylidenic monomer with the copolymerisable anhydride. A large number of products can act as catalyst in this polymerisation; they are well known by specialists and it would be superfluous to enumerate them.

The quantity of catalyst utilised is a function of the quality of the catalyst and of the quantity of monomer to be polymerised; it is generally between 0.1 and 10% by weight of the initial mixture. Often, the swelling agent ensuring the formation of the "embryonic" cells is at the same time a polymerisation catalyst; it is obvious that in this case it can be utilised to play both parts simultaneously.

By a swelling agent, we mean a chemical compound whose thermal decomposition is accompanied by the giving off of a gas, preferably nitrogen, such as azodiisobutyronitrile, azodicarbonamide or the like.

The saturated halogenated hydrocarbons are all alkanes having a molecule containing at least one atom of halogen and of which the boiling point is between −50° C. and +100° C. under normal pressure. Examples of these alkanes are carbon tetrachloride, chloroform, trichloromonofluoromethane, dichlorodifluoromethane, monochlorodifluoromethane, trichlorotrifluoroethane or the like. They are utilised in proportions of from 5 to 30% to the total weight of the mixture.

The following examples of mixtures, which are in no way restrictive, in which all the proportions mentioned are proportions by weight, are given in order to illustrate the present invention.

Each mixture was produced in an internal Werner-type mixer for about 3 to 5 minutes, until a homogeneous and smooth paste was obtained.

This prepared paste was inserted in a mould of which the dimensions were: 20 cm. x 20 cm. x 2 cm., which was hermetically closed and heated under pressure between the platens of a press. The temperature was raised to 175° C., and the mould was kept at this temperature for 10 minutes.

After this heating, the mould was cooled but kept under pressure. The "embryonic" cellular object, was withdrawn from the mould, and placed in a damp enclosure heated to 100° C. The object was kept in this enclosure until a stable volume was obtained, which required a period of about 2 to 3 days in the experiments.

In each case, the density of the cellular product obtained was measured and the average coefficient of thermal conductivity was measured as between 20 and 70° C. after leaving the sample for 1000 hours at 80° C. The results are summed up in the following tabular summary:

TABULAR SUMMARY

|  | I | II | III | IV | V | VI |
|---|---|---|---|---|---|---|
| Polyvinylchloride | 43 | 43 | 43 | 43 | 48 | 53 |
| Toluene diisocyanate | 25 | 25 | 25 | 25 | 25 | 25 |
| Phthalic anhydride |  |  |  | 15 |  |  |
| Maleic anhydride | 15 | 15 | 15 |  | 15 | 15 |
| Azodiisobutyronitrile | 2 | 2 | 2 | 2 | 2 | 2 |
| Styrene | 5 |  | 5 | 5 |  | 5 |
| Acrylonitrile |  | 5 |  |  |  |  |
| Trichloromonofluoromethane | 10 | 10 |  | 10 | 10 |  |
| Trichlorotrifluoroethane |  |  | 10 |  |  |  |
| Density in kg./m.³ | 32 | 32 | 29 | 30 | 34 | 34 |
| Average coefficient of thermalconductivity between 20 and 70° C | 0.016 | 0.018 | 0.017 | 0.026 | 0.030 | 0.029 |

Where only the samples I, II and III were part of the present invention and the results obtained were compared with those obtained with mixtures from which one of the ingredients was omitted in order to indicate the importance of each of them. The presence of 10 parts of saturated halogenated hydrocarbon in no way prejudiced the rigidity of the cellular product according to the invention.

What we claim is:

1. A rigid cellular product comprised of polyvinylchloride containing grafted thereon side chains of copolymer of at least one vinylidenic monomer containing a $CH_2=C<$ group and polymerizable by a radical reaction with an ethylenically-unsaturated carboxylic acid anhydride selected from the group which consists of acrylic anhydride, citraconic anhydride, itaconic anhydride and maleic anhydride, and cross-linked by an organic polyisocyanate, said polyvinylchloride being present in the amount of from 20 to 95% by weight, said vinylidenic monomer being present in the amount of from 2 to 30% by weight, said anhydride being present in the amount of from 2 to 30% by weight and said polyisocyanate being present in an amount of from 0.5 to 60% by weight, said cellular product being characterized by the presence of a saturated halogenated hydrocarbon having a boiling point under normal pressure between −50° C. and +100° C. in the amount of from 5 to 30% by weight.

2. A rigid cellular product according to claim 1 wherein said saturated halogenated hydrocarbon is selected from the group which consists of trichloro-monofluoro-methane, dichlorodifluoro-methane, monochloro-difluoro-methane and trichloro-trifluoro-ethane.

3. A rigid cellular product comprised of polyvinylchloride containing grafted thereon side chains of copolymer of at least one vinylidenic monomer containing a $CH_2=C<$ group and polymerizable by a radical reaction with an ethylenically-unsaturated carboxylic acid anhydride selected from the group which consists of acrylic anhydride, citraconic anhydride, itaconic anhydride and maleic anhydride, and cross-linked by an aromatic polyisocyanate, said polyvinylchloride being present in the amount of from 20 to 95% by weight, said vinylidenic monomer being present in the amount of from 2 to 30% by weight, said anhydride being present in the amount of from 2 to 30% by weight and said polyisocyanate being present in an amount of from 0.5 to 60% by weight, said cellular product being characterized by the presence of a saturated halogenated hydrocarbon having a boiling point under normal pressure between −50° C. and +100° C. in the amount of from 5 to 30% by weight.

4. In a process for preparing rigid cellular products which comprises preparing an initial mixture which consists in polyvinylchloride, an organic polyisocyanate, a blowing agent which releases nitrogen when heated, at least one vinylidenic monomer containing a $CH_2=C<$ group and polymerizable by a radical reaction, and an ethylenically-unsaturated carboxylic acid anhydride, heating the resultant mixture in a mold under pressure, cooling the mold under pressure, removing the product thus produced from the mold, and heating the product in the presence of a member selected from the group consisting of water and water vapor, the improvement which consists in incorporating in said initial mixture a saturated halogenated hydrocarbon having a boiling point under normal pressure of between −50° C. and +100° C.

5. A process according to claim 4 wherein said saturated halogenated hydrocarbon is selected from the group which consists of trichloro-monofluoro-methane, dichlorodifluoro-methane, monochloro-difluoro-methane, and trichloro-trifluoro-ethane.

6. A process according to claim 4 wherein said halogenated hydrocarbon is incorporated in an amount of 5 to 30% of the weight of said initial mixture.

7. In a process for preparing rigid cellular products which comprises preparing an initial mixture which consists in polyvinylchloride, an aromatic polyisocyanate, a blowing agent which releases nitrogen when heated, at least one vinylidenic monomer containing a $CH_2=C<$ group and polymerizable by a radical reaction, and an ethylenically-unsaturated carboxylic acid anhydride, heating the resultant mixture in a mold under pressure, cooling the mold under pressure, removing the product thus produced from the mold, and heating the product in the presence of a member selected from the group consisting of water and water vapor, the improvement which consists in incorporating in said initial mixture a saturated halogenated hydrocarbon having a boiling point under normal pressure of between −50° C. and +100° C.

(References on following page)

References Cited by the Examiner

UNITED STATES PATENTS

| | | | |
|---|---|---|---|
| 2,739,134 | 3/1956 | Parry et al. | 260—2.5 |
| 2,831,820 | 4/1958 | Aase et al. | 260—2.5 |
| 2,941,965 | 6/1960 | Ingram | 260—2.5 |
| 3,052,643 | 9/1962 | Lineberry | 260—2.5 |
| 3,066,110 | 11/1962 | Cornell | 260—2.5 |
| 3,122,515 | 2/1964 | Peterson et al. | 260—2.5 |

SAMUEL H. BLECH, *Primary Examiner.*

MURRAY TILLMAN, *Examiner.*

M. FOELAK, *Assistant Examiner.*